(12) United States Patent
Erickson et al.

(10) Patent No.: US 6,579,043 B2
(45) Date of Patent: Jun. 17, 2003

(54) MULTI-PURPOSE INSERT AND TOOLHOLDER ASSEMBLY

(75) Inventors: Robert A. Erickson, Raleigh, NC (US); John G. Hale, Aurora, OH (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/900,686

(22) Filed: Jul. 6, 2001

(65) Prior Publication Data

US 2003/0007841 A1 Jan. 9, 2003

(51) Int. Cl.[7] .............................. B23B 27/16; B23C 5/00
(52) U.S. Cl. ........................................ 407/35; 407/43
(58) Field of Search ..................... 407/113–116, 24, 407/25, 30, 34, 35, 36–39, 53, 55, 61

(56) References Cited

U.S. PATENT DOCUMENTS

| | | | |
|---|---|---|---|
| 1,104,541 A | | 7/1914 | Phelan |
| 1,140,261 A | | 5/1915 | Pattinson |
| 1,926,531 A | * | 9/1933 | Graham |
| 3,759,625 A | * | 9/1973 | Iversen ..................... 407/104 |
| 3,760,474 A | | 9/1973 | Stein ............................ 29/95 |
| 3,859,700 A | * | 1/1975 | Jilbert ........................ 407/103 |
| 4,169,690 A | * | 10/1979 | Kendra ....................... 407/103 |
| 4,211,507 A | * | 7/1980 | Kress et al. ................ 407/103 |
| 4,880,339 A | | 11/1989 | Döge ........................... 408/161 |
| 4,993,893 A | | 2/1991 | Niebauer ..................... 407/116 |
| 5,348,065 A | * | 9/1994 | Meyer ......................... 144/230 |
| 5,669,744 A | * | 9/1997 | Hines ...................... 144/136.95 |

* cited by examiner

*Primary Examiner*—Derris H. Banks
*Assistant Examiner*—Bena Miller
(74) *Attorney, Agent, or Firm*—Larry R. Meenan

(57) ABSTRACT

A cutting insert has an insert body with at least one pair of cutting regions. Each cutting region is comprised of a cutting edge and the cutting edges in a pair are diametrically opposed to one another about a pair axis. Each cutting edge of a pair faces a single rotary direction along a pair circle, and for each pair of cutting regions the cutting edges have cutting profiles that are not identical to one another. In a toolholder assembly utilizing this arrangement, the cutting edges of a pair protrude beyond the perimeter of the toolholder.

16 Claims, 6 Drawing Sheets

MULTI-PURPOSE INSERT AND TOOLHOLDER ASSEMBLY

BACKGROUND OF THE INVENTION

1. Field of the Invention

The invention relates to cutting inserts used in metalworking operations, and more particularly, is directed to a cutting insert having distinct edges each capable of machining in a different profile.

2. Description of the Related Art

In metalworking operations it is typical to utilize a cutting insert mounted within a toolholder, whereby that cutting insert is dedicated to cutting a workpiece to impart a particular profile. However, machining a workpiece to a finished product oftentimes requires many distinct operations using many different types of cutting inserts separately engaged with the workpiece wherein each insert has a different cutting profile. As an example, threading the inner wall of a cylinder would typically require a first pass with a roughing tool to insure the inner diameter is concentric and to remove any voids that may have been generated during the fabrication of the workpiece. A cutting insert of this type would have a blunt edge which engages a relatively large width of the workpiece.

After this step, a second machining operation utilizing a threading insert is required. However, the roughing insert must now be removed from the toolholder, and the threading insert introduced. To do this, the spindle turning the workpiece would have to be stopped and the toolholder partially disassembled to remove one insert and to insert another, thereby producing downtime in which the machining tool is not active. To be efficient, it is necessary to utilize the tool as much as possible, and to minimize such downtime.

Another manner in which the same operation might be performed would involve the use of two separate toolholders, whereby one toolholder has an insert suitable for roughing, while a second toolholder has an insert suitable for threading. Each of these toolholders could be introduced to the workpiece either separately or simultaneously. However, this requires the use of two toolholders and furthermore, such an arrangement consumes twice the space that would be consumed by a single toolholder. This is an inefficient use of space, and furthermore, the simultaneous use of two toolholders may be impossible when the bore of the workpiece is so small that only a single toolholder may fit within it.

A design is needed to eliminate the necessity of changing cutting inserts during a metal working operation, or introducing a second toolholder during a metal cutting operation in order to accomplish a specific task. Furthermore, a design is needed that would eliminate the need to change one insert within a toolholder with another insert when the use of a single toolholder is the only option available to a machinist.

U.S. Pat. No. 4,880,339 entitled "Drill Bar With A Cutting Insert" illustrates a single cutting insert having two opposing edges protruding from the toolholder such that a workpiece may be engaged by either of these edges depending upon the position of the toolholder. However, the two opposing cutting edges of this insert are identical to one another, such that multiple metal working operations are not possible.

U.S. Pat. No. 1,926,531 entitled "Multiple Tool And Holder" is directed to an insert having three distinct cutting regions radially positioned at approximately equal angles to one another such that each of these cutting regions may be positioned to engage the workpiece. However, this nonconventional arrangement requires the cutting insert to be repositioned for each cutting operation desired. Furthermore, the cutting edges of each of these cutting regions face the same upward direction thereby restricting the versatility of the insert. In particular, such a cutting insert would not be useful for the linear side-to-side motion available on the spindle of many machine tools.

SUMMARY OF THE INVENTION

In one embodiment of the subject invention, a cutting insert is comprised of:
  a) an insert body having at least one pair of cutting regions;
  b) wherein each cutting region is comprised of a cutting edge;
  c) wherein each of the cutting edges in a pair is diametrically opposed about a pair axis; and
  e) wherein at least one pair of cutting regions has two cutting edges with cutting profiles that are not identical to one another.

In another embodiment, a toolholder assembly is comprised of:
  a) a tool holder having an outer profile;
  b) a cutting insert mounted within the toolholder, wherein the insert is comprised of:
    1) an insert body having at lest one pair of cutting regions;
    2) wherein each of the cutting regions in a pair is diametrically opposed about a pair axis;
  c) wherein each cutting region is comprised of a cutting edge;
  d) wherein the cutting edges of each pair of regions face a single rotary direction along a pair circle about the pair axis and extend beyond the outer profile of the toolholder; and
  e) wherein at least one pair of cutting regions has two cutting edges with cutting profiles that are not identical to one another.

DESCRIPTION OF THE PREFERRED EMBODIMENT

Figure 1:
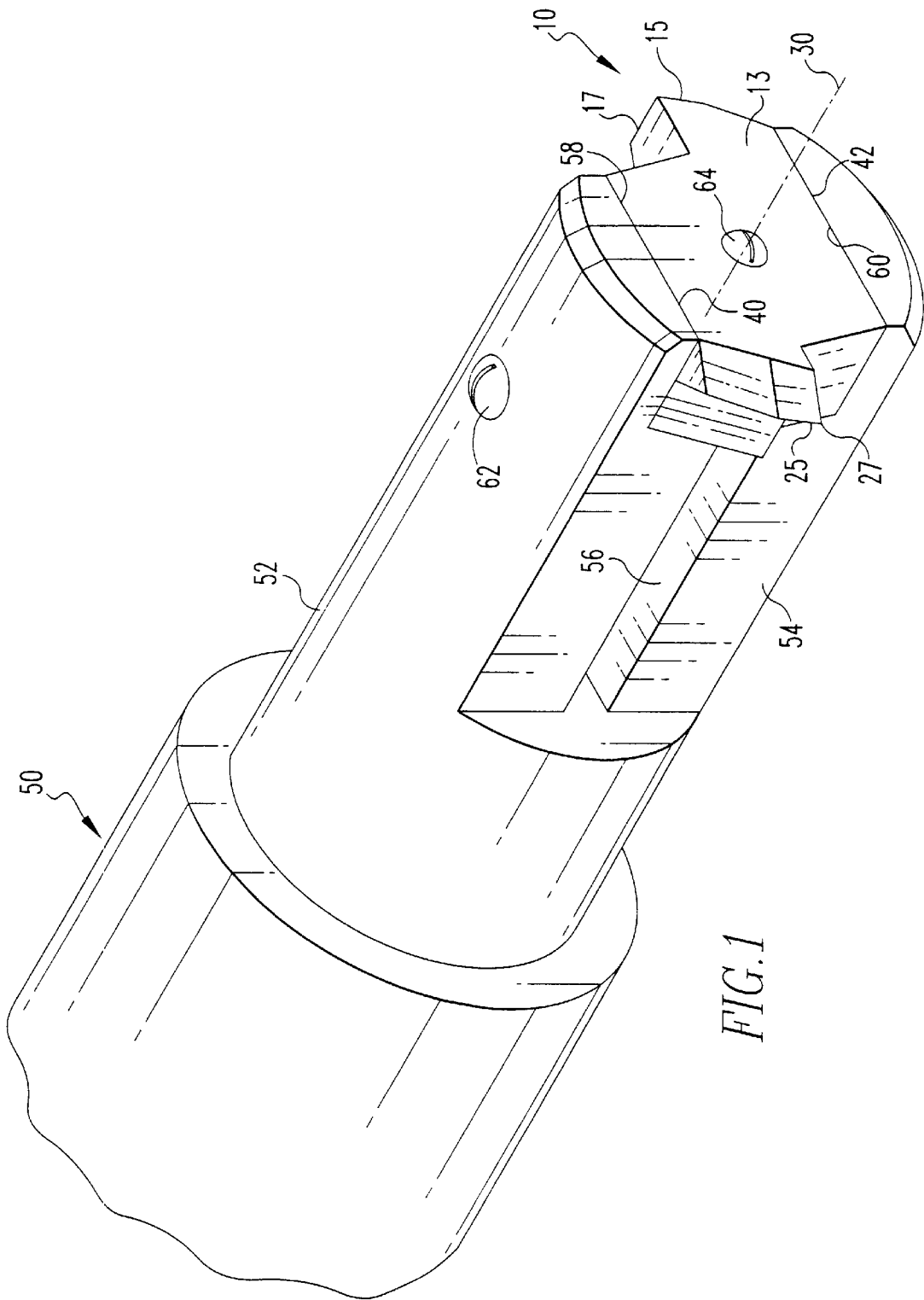
FIG. 1 is an isometric view of a cutting insert and toolholder in accordance with a first embodiment of the subject invention.
Figure 2:
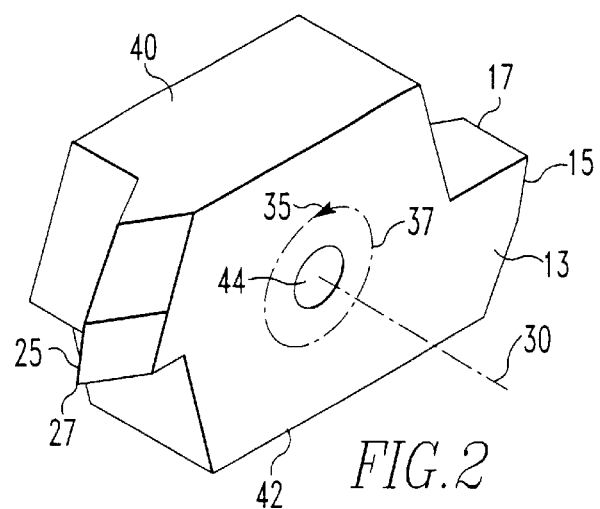
FIG. 2 is an isometric view of the cutting insert illustrated in FIG. 1.
Figure 3:
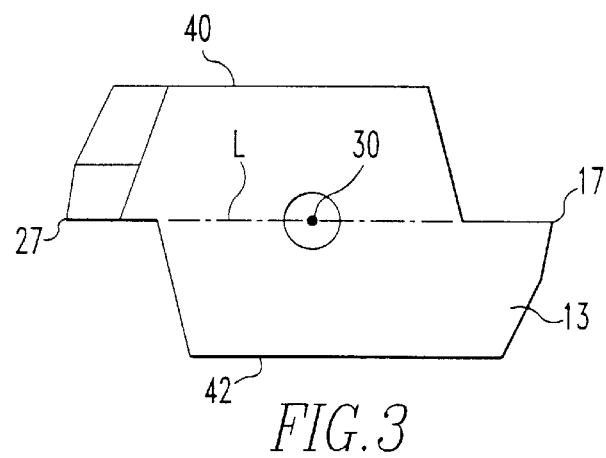
FIG. 3 is a side view of the cutting insert illustrated in FIG. 2.

A cutting insert 10, as shown in FIG. 1, has an insert body 13, with a first cutting region 15, and a second cutting region 25. The first cutting region 15 is comprised of a cutting edge 17, while the second cutting region 25 is comprised of a cutting edge 27. A pair axis 30 extends through the insert body 13, and each of the cutting edges 17, 27 are diametrically opposed about the pair axis 30. Directing attention to FIGS. 2–4, additional details of cutting insert 10 are discussed. In particular, the first cutting region 15 and the second cutting region 25 define a pair of cutting regions, and cutting edges 17, 27 of each pair face a single rotary direction 35, along a pair circle 37 about the pair axis 30.

The two cutting edges 17, 27 in the pair of cutting regions 15, 25 each have different cutting profiles that are not identical to one another. In particular, cutting edge 17 is blunt and may be used for roughing the surface of a workpiece, while cutting edge 27 is pointed and suitable for imparting thread forms into a workpiece.

Returning attention to FIG. 1, the insert 10 may be secured within a toolholder 50, utilizing a clamping arrangement in which a first half 52 and a second half 54 of the toolholder 50 are separated by a slot 56. Half 52 has a first surface 58 which engages the top surface 40 of the insert 10. Half 54 has a second surface 60 which engages the bottom surface 42 of the insert 10.

The first half 52, and second half 54 are urged together by a bolt 62 extending through the first half 52, and threadably engaged with the second half 54 such that rotation of the bolt urges the first half 52 toward the second half 54, thereby compressing the top surface 40 and the bottom surface 42 of the insert 10 between the first and second halves 52, 54.

In the alternative, the insert body 13 may have a bore 44 (FIG. 2), extending therethrough for accepting a mounting screw 64 (FIG. 1), which is threadably engaged with the toolholder 50. Under such circumstances the shank of the toolholder 50 may be solid and the insert 10 secured directly to the end of the shank via the mounting screw 64. If the insert 10 is clamped by halves 52, 54, then the bore 44 is not necessary.

It should be appreciated that either the bolt 62 may be used with the first and second halves 52, 54 to engage the insert 10 or the mounting screw 64 to secure the insert 10 to the end of the toolholder 50. However, it is typical to se one or the other of these mechanisms and not both for securing the insert 10.

It should be appreciated that each of the cutting edges 17, 27 protrudes beyond the outer perimeter of the toolholder 50. This arrangement permits each cutting edge 17, 27 access to the workpiece, allowing the cutting insert 10 to engage in two distinct metalworking operations, such as, for example, roughing and threading.

Figure 5A:
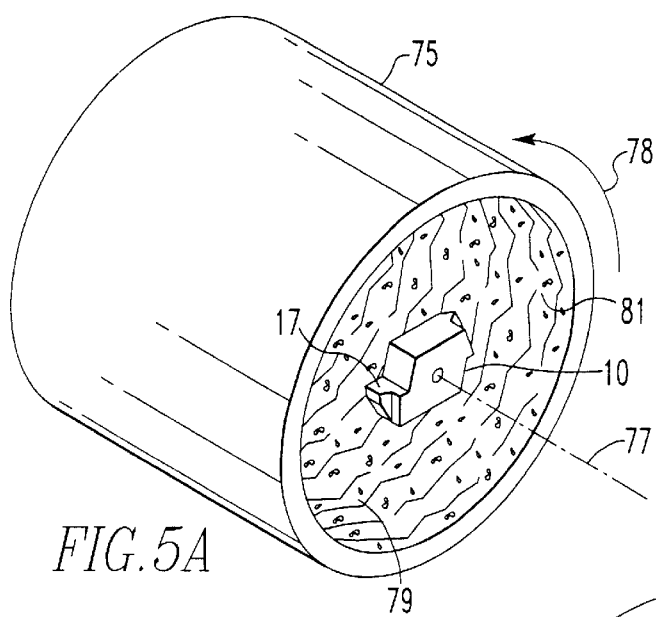
FIGS. 5A–5C are isometric views illustrating the manner in which the cutting insert may be utilized.
Figure 5B:
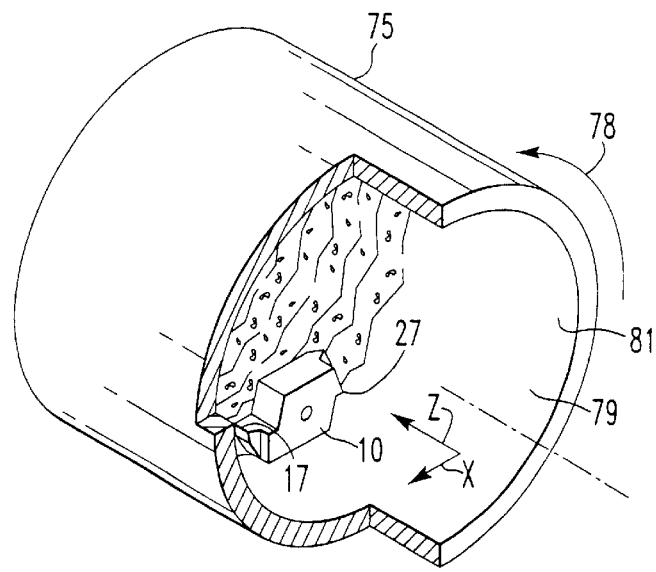
Figure 5C:
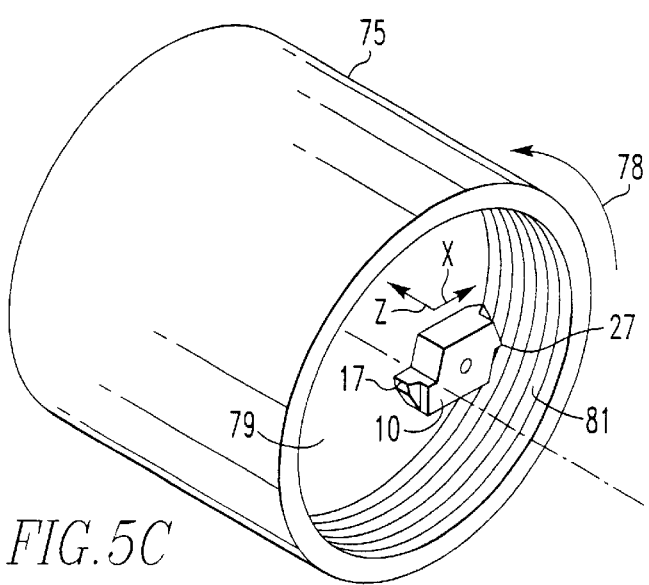

Directing attention to FIGS. 5A–5C, a workpiece 75 rotating about workpiece axis 77 in the direction indicated by arrow 78 has a workpiece bore 79 extending therethrough. The wall 81 of the bore, as illustrated in FIG. 5A, has a relatively rough surface that may be comprised of a number of pits and, furthermore, may be eccentric about the axis 77. With the goal of imparting internal threads to the wall 81 of the bore 79, it is first necessary to remove an initial layer of the material at the wall 81, and to smooth the wall 81, and to insure the wall 81 is concentric about the axis 77 of the workpiece 75. The insert 10, in accordance with the subject invention, is capable of both roughing the workpiece and imparting thread forms to the workpiece using only a single insert within a single toolholder.

Directing attention to FIG. 5A, the insert 10 is illustrated without the presence of the toolholder for illustrative purposes. With the insert 10 positioned within the bore 79, as illustrated in FIG. 5A, the insert 10 may be axially and laterally advanced, as illustrated by arrows X and Z in FIG. 5B, such that the roughing cutting edge 17 engages the wall 81 of the workpiece 75. This step prepares the wall 81 for the subsequent threading process. Once the wall 81 is prepared, the insert 10 may be laterally advanced in the opposite direction across the width of the bore 79 such that the roughing cutting edge 17 is disengaged, and the threading cutting edge 27 is engaged with the wall 81. At this point, the insert 10 is again axially advanced thereby imparting threads, as illustrated in FIG. 5C. It should be appreciated that by utilizing such a cutting insert 10, it is possible to use a single insert and a single toolholder to accomplish both roughing and threading on the inside of a bore, as illustrated in FIGS. 5A–5C. Although illustrated in FIGS. 5A–5C is a combination of roughing and threading, it is entirely possible for the cutting edges of the insert to accomplish a number of other machining operations including grooving, chamfering, turning, facing and boring.

Figure 4:
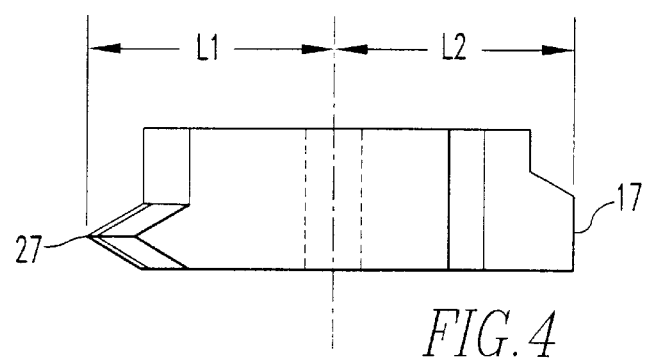
FIG. 4 is a top view of the cutting insert illustrated in FIG. 3.

Returning to FIG. 3, a line L connecting cutting edge 17 and cutting edge 25 may intersect with the pair axis 30. Additionally, as shown in FIG. 4, the cutting edges 17, 27 at their outermost portion may be equidistant from the pair axis 30 such that distances L1 and L2 from the pair axis 30 to the outermost portions of cutting edges 17, 27 respectively are equal. However, it is entirely possible for these cutting edges 17, 27 to be different distances from the pair axis 30 and under those circumstances, for example, the lateral distance the insert 10 must be displaced to engage the wall 81 in the arrangement discussed in FIGS. 5A–5C would be different for each cutting edge 17, 27.

Cutting insert 10 illustrates a single pair of cutting regions 15, 25 having cutting edges 17, 27 diametrically opposed from one another. It is entirely possible for a cutting insert to have more than one pair of cutting regions having diametrically opposed cutting edges.

Figure 6:
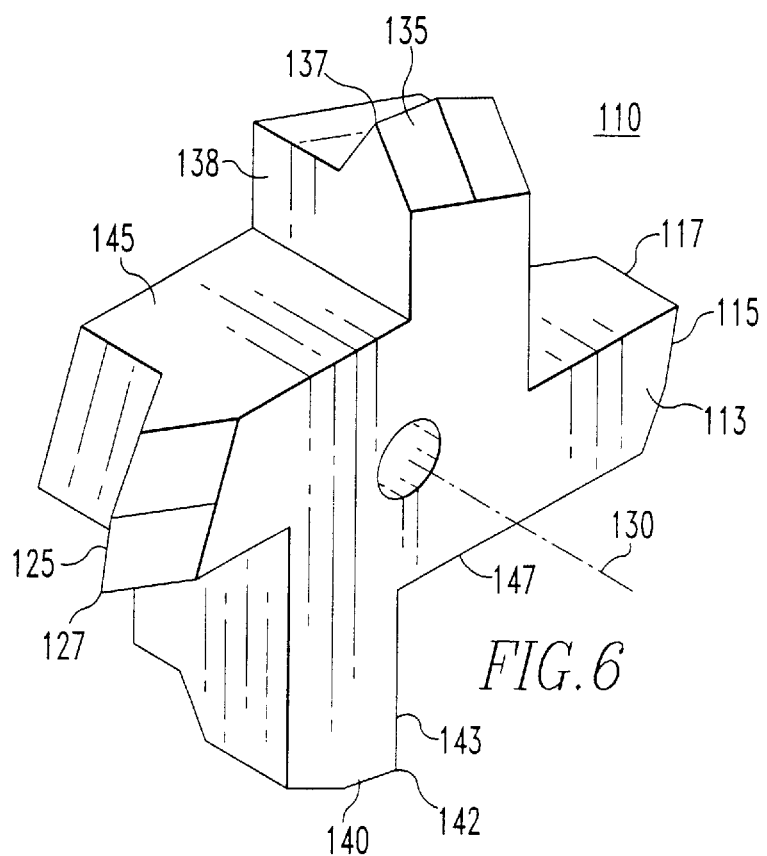
FIG. 6 is a cutting insert in accordance with a second embodiment of the subject invention.

FIG. 6 illustrates a cutting insert 110, having a first cutting region 115, a second cutting region 125, a third cutting region 135 and a fourth cutting region 140, having cutting edges 117, 127, 137 and 142, respectively. The first cutting region 115 and the second cutting region 125 form one pair of cutting regions. The third cutting region 135 and the forth cutting region 140 form a second pair of cutting regions, whereby the cutting edges of each pair are diametrically opposed about a pair axis 130 extending through the body 113 of the insert 110.

Cutting insert 110 may be mounted within a toolholder (not shown) similar to that illustrated as toolholder 50 in FIG. 1. However, the toolholder must be modified. In one such embodiment, the first half 52 of the toolholder 50 is modified to simultaneously contact the top surface 138 (FIG. 6) of the third cutting region 135 and the bottom surface 145 of the second cutting region 125. Furthermore, the second half 54 of the toolholder 50 may be modified to simultaneously contact the bottom surface 147 of the first cutting region 115 and the top surface 143 of the fourth cutting region 140. This configuration provides structural support for cutting operations involving the first cutting edge 117 and the second cutting edge 127. For operation of the third cutting edge 135 and fourth cutting edge 142, it is necessary to rotate the insert 110 ninety degrees within the toolholder so that these cutting edges have structural support.

From inspection of cutting insert 10 in FIG. 1, and cutting insert 110 in FIG. 6, it is apparent that each of these inserts is oriented in a similar direction within a toolholder. These inserts are generally referred to as on-edge inserts.

Figure 7:
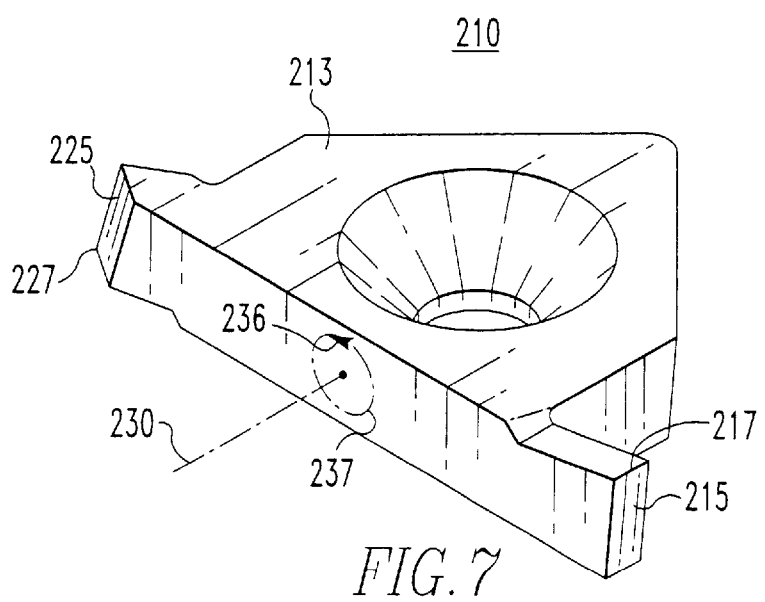
FIG. 7 is a cutting insert in accordance with a third embodiment of the subject invention.
Figure 8:
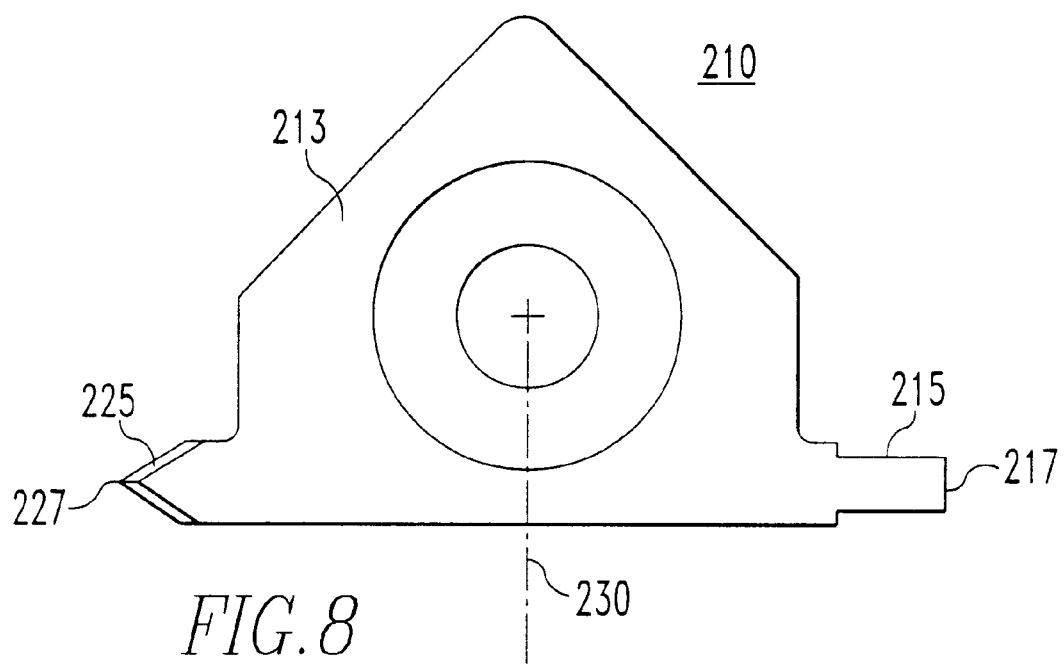
FIG. 8 is a side view of the insert illustrated in FIG. 7.
Figure 9:
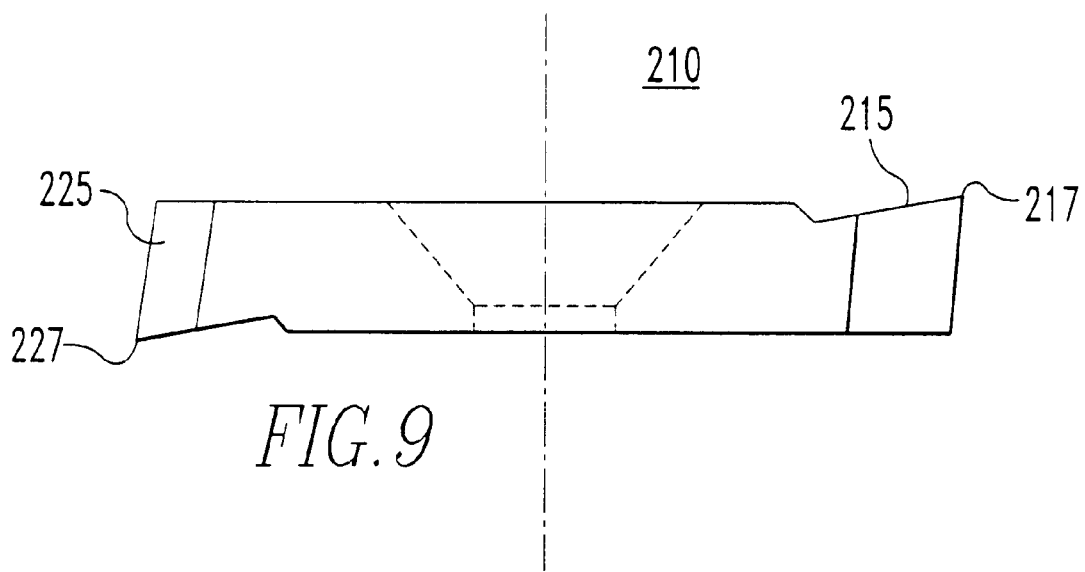
FIG. 9 is a top view of the cutting insert illustrated in FIG. 7.

While the invention so far has been discussed with respect to on-edge inserts, it is also possible to utilize a different type of insert known as a lay-down insert, for the subject invention. In particular, directing attention to FIGS. 7–9, a cutting insert 210 having a body 213, with a first cutting region 215, and a second cutting region 225, wherein each cutting region 215, 225 has cutting edges 217, 227, respectively. Just as before, cutting regions 215, 225 comprise a pair of cutting regions wherein each cutting region is comprised of a cutting edge 217, 227. Each of the cutting edges 217, 227 is diametrically opposed about a pair axis 230. Each of the cutting edges 217, 227 of a pair of cutting regions 215, 225 faces a single rotary direction 236 along a pair circle 237 about the pair axis 230. Furthermore, each of the cutting edges 217, 227 has a cutting profile not identical to the other. In particular, cutting edge 217 may be used for grooving, while cutting edge 227 may be used for threading. However, just as before, each cutting edge may be used for one type of machining from the group of threading, grooving, chamfering, turning, facing and boring.

Figure 10:
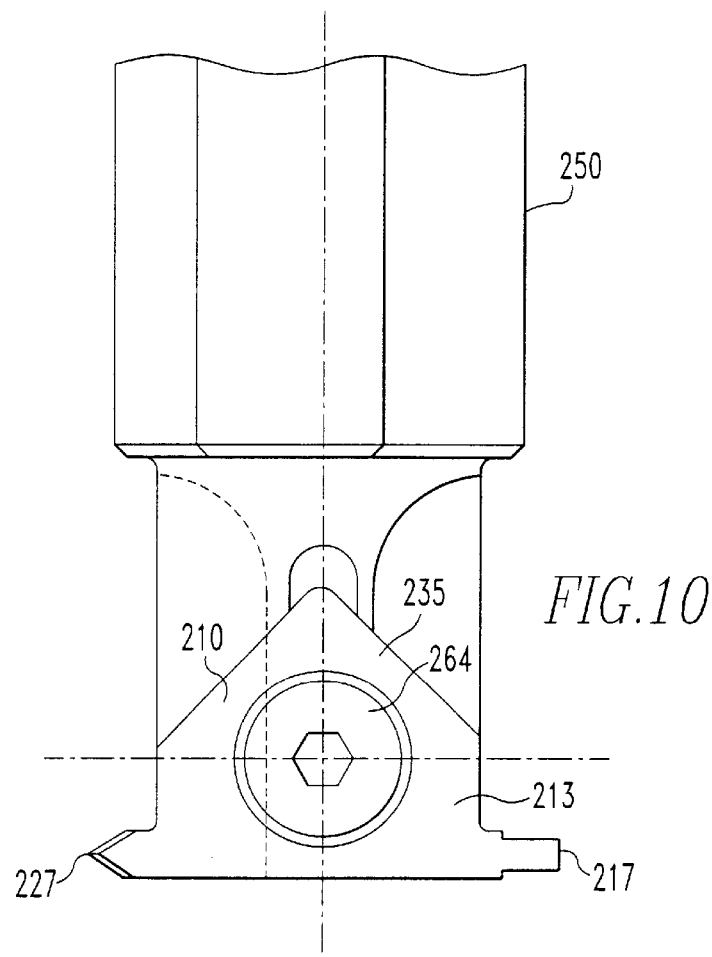
FIG. 10 is a top view of a portion of a toolholder suitable to secure the insert illustrated in FIG. 7.
Figure 11:
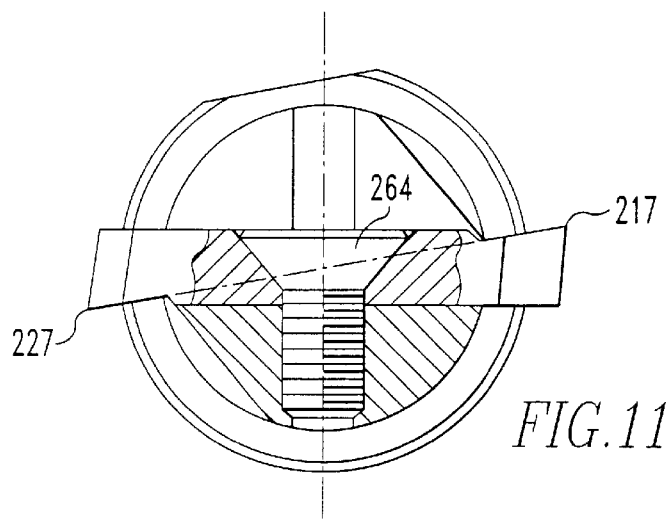
FIG. 11 is a side view of the toolholder assembly illustrated in FIG. 10.

Insert 210, as illustrated in FIGS. 10 and 11, is mounted differently in toolholder 250 than are on-edge inserts 10, 110. In particular, cutting insert 210 rests not on the edges of the insert, but on the major surfaces of the insert such that it is referred to as a lay-down insert. The insert 210 may be secured by a mounting screw 264, extending within a bore through the cutting insert body 213 and threadably engaged with a bore extending within the toolholder 250.

The insert 210 may rest within a pocket 235 of the toolholder, thereby providing lateral support to the insert 210. Cutting edge 217 and cutting edge 227, just as previous designs, extend beyond the perimeter of the toolholder 250, such that the workpiece (not shown) may be engaged by either cutting edge 217, 227 through lateral displacement of the toolholder 250.

Although not illustrated in the figures, it should be appreciated that any of the cutting regions in the subject invention may be supplemented with chip control features behind the cutting edge, thereby promoting the formation and breakage of chips produced by a metal cutting operation.

Although not illustrated in FIG. 10 or FIG. 11, it should furthermore be appreciated that insert 210 may be secured within a toolholder 250 utilizing a clamping arrangement, whereby the top surface of the insert 210 is urged within the pocket 235 by an exterior clamp (not shown) rather than the screw 264, illustrated in FIGS. 10 and 11.

It is thought the present invention and many of its intended advantages will be understood from the foregoing description and that it will be apparent that various changes may be made in the form construction of an arrangement of the parts thereof, without departing from the spirit and scope of the invention, or sacrificing all of its material advantages, the form herein before described merely preferred or exemplary embodiments thereof.

What is claimed is:

1. A cutting insert comprising:
    a) an insert body having a least one pair of cutting regions;
    b) wherein each said cutting region is comprised of a cutting edge;
    c) wherein each of the cutting edges in a pair is diametrically opposed about a pair axis;
    d) wherein each cutting edge of a pair of cutting regions faces a single rotary direction along a pair circle about the pair axis;
    e) wherein at least one pair of cutting regions has two cutting edges with cutting profiles that are not identical to one another.

2. The insert according to claim 1 wherein each cutting edge may be used for one from the group of threading, grooving, chamfering, turning, facing and boring.

3. The insert according to claim 1 wherein a line connecting the cutting edges of said at least one pair intersects with the pair axis.

4. The insert according to claim 1 wherein the cutting edges of a pair have outer edges and the outer edges are equidistant from the pair axis.

5. The insert according to claim 1 further including a second pair of cutting regions having cutting edges diametrically opposed to one another.

6. The insert according to claim 5 wherein the two pairs of cutting regions are oriented orthogonally relative to one another.

7. The insert according to claim 1 wherein at least one cutting edge has chip control features.

8. The insert according to claim 1 wherein the insert body has a bore extending therethrough for accepting a mounting screw.

9. The insert according to claim 1 wherein the insert body has one surface to accept a clamp for securing the insert within the pocket of a toolholder.

10. The insert according to claim 1 wherein the insert is an on-edge insert.

11. The insert according to claim 1 wherein the insert is a lay-down insert.

12. A toolholder assembly comprising
    a) a toolholder having an outer profile;
    b) a cutting insert mounted within the toolholder;
    wherein the insert is comprised of an insert body having at least one pair of cutting regions;
    c) wherein each said cutting region is comprised of a cutting edge;
    d) wherein each of the cutting regions in a pair is diametrically opposed about a pair axis;
    e) wherein the cutting edges of each pair of regions face a single rotary direction along a pair circle about the pair axis and extend beyond the outer profile of the toolholder; and
    f) wherein at least one pair of cutting regions has two cutting edges with cutting profiles that are not identical to one another.

13. The toolholder assembly according to claim 12 wherein the insert has a bore extending therethrough and a screw extends through the bore and engages the toolholder to secure the insert within the toolholder.

14. The toolholder assembly according to claim 12 wherein the insert has at least two opposing surfaces, the toolholder has a pocket adapted to receive the insert and the toolholder has a clamp attached thereto which urges the insert within the toolholder pocket.

15. The toolholder assembly according to claim 12 wherein the insert is an on-edge insert.

16. The toolholder assembly according to claim 12 wherein the insert is a lay-down insert.

* * * * *